May 23, 1961  H. V. BANNISTER  2,985,317
BALLAST RECEPTACLES FOR CRANES
Filed June 24, 1957  6 Sheets-Sheet 1

INVENTOR.
Harold V. Bannister
BY
ATTORNEYS

May 23, 1961 H. V. BANNISTER 2,985,317
BALLAST RECEPTACLES FOR CRANES
Filed June 24, 1957 6 Sheets-Sheet 2

INVENTOR.
Harold V. Bannister
BY
Shoemaker & Mattare
ATTORNEYS

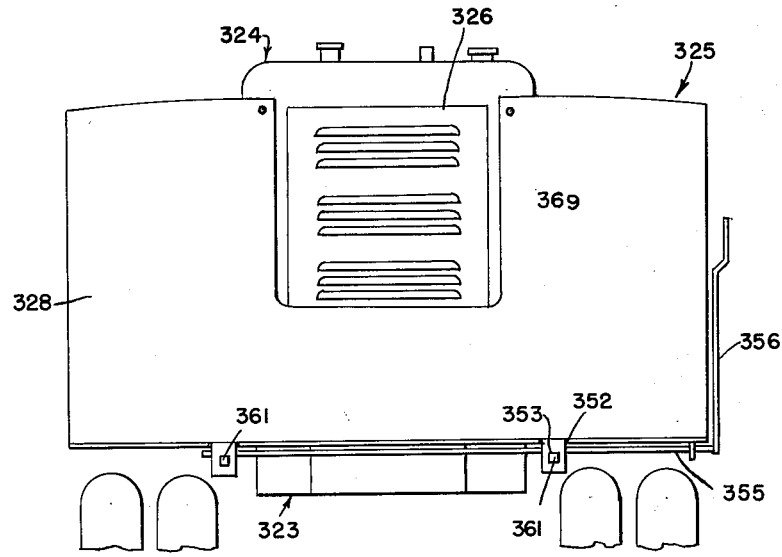
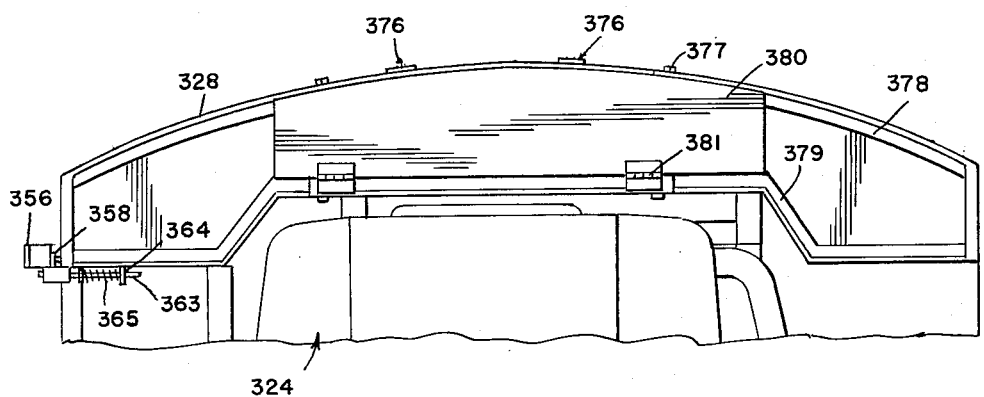

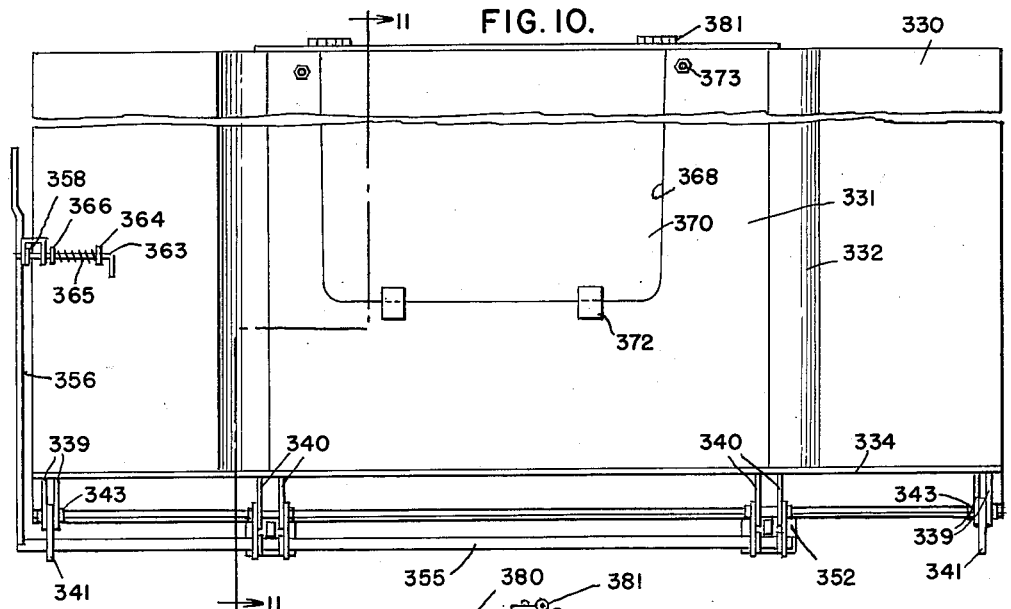
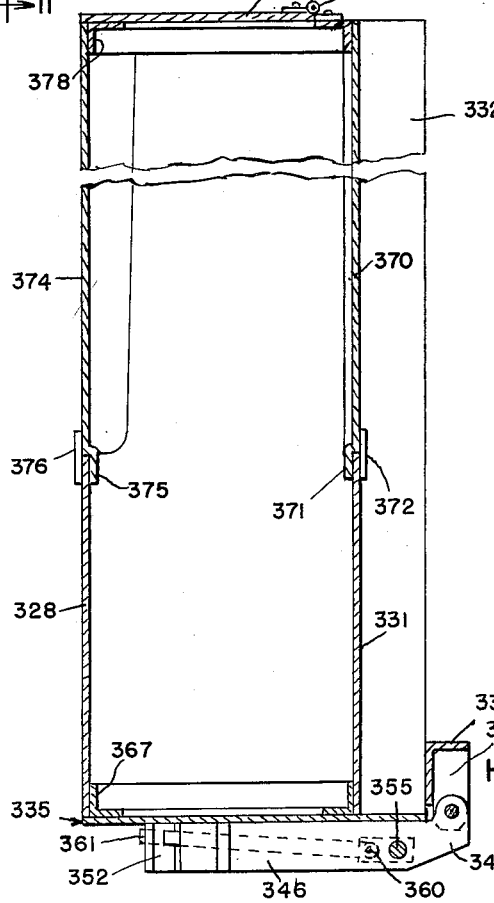

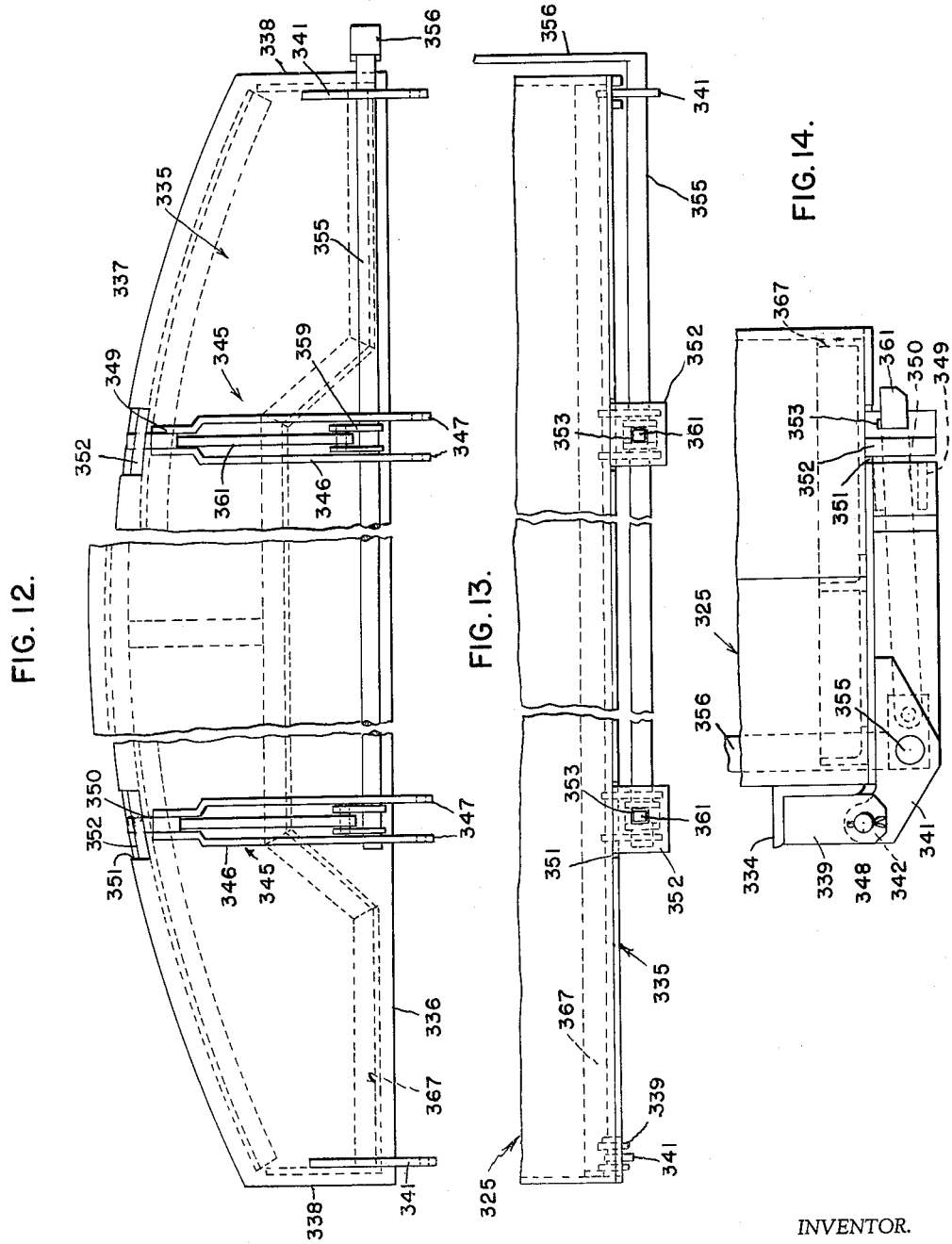

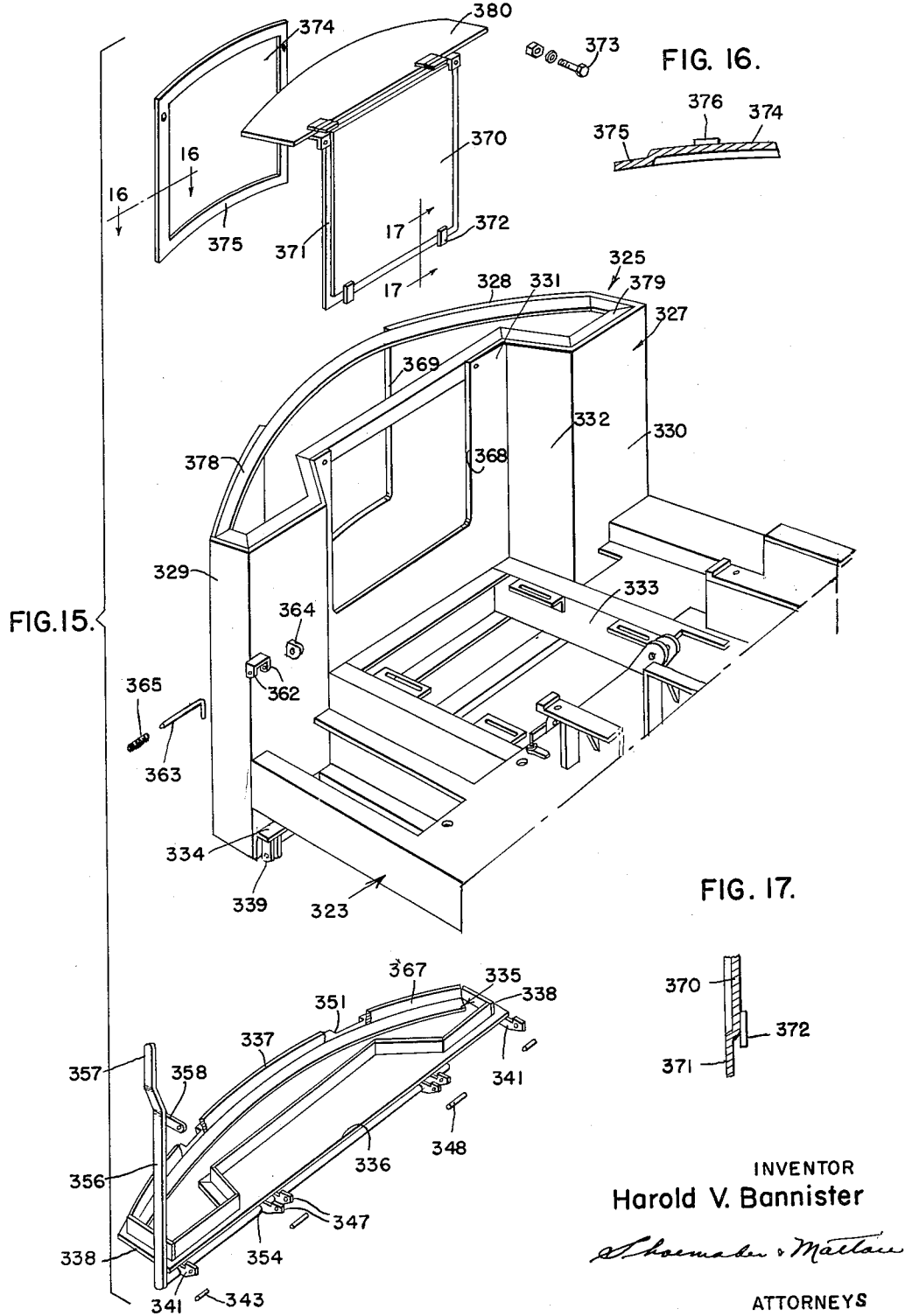

United States Patent Office 2,985,317
Patented May 23, 1961

2,985,317

BALLAST RECEPTACLES FOR CRANES

Harold V. Bannister, Waverly, Iowa, assignor to Schield Bantam Company, Waverly, Iowa, a corporation of Iowa Filed June 24, 1957, Ser. No. 667,324

8 Claims. (Cl. 212—49)

This improvement relates broadly to cranes and is directed particularly to improvements in ballast containers or receptacles for the same.

The present application is a continuation-in-part of my prior application which issued on October 15, 1957, as Patent No. 2,809,756.

In the above identified application, of which the present one forms a continuation-in-part, there is disclosed a crane structure of a mobile, highly maneuverable type designed and adapted for use by the military and in particular being capable of being airborne for transport by cargo or similar planes, gliders, etc.

The airborne crane of the allowed application is such that, as a unit, it may be readily picked up and transported by a cargo or similar plane or glider and very readily be placed in use.

As is pointed out in that application, in order for a crane to be useful for the military, particularly for air transport, it must meet critical conditions as to height, weight, width, length, mobility and maneuverability, whereby it is not only capable of being so airborne but of being readily and quickly placed in operation as required and necessary under certain conditions.

In such a crane structure designed for air transport, the matter of counterbalancing the same is quite important and in addition it is also very important that the weight of the crane be maintained at a minimum and, therefore, it is desirable that the counterbalancing structure for the crane be of a character which can have its weight changed so that the counterbalance can be lightened when the crane is to be airborne and can be made heavier when the crane is put into operation.

In the light of the foregoing, it is accordingly a particular object of the present invention to provide a unique ballast containing receptacle or tank designed to be mounted on or attached to a swing platform forming a part of the crane structure and which tank is designed to have a suitable ballast material placed therein when the crane is to be used and readily dumped or emptied of such ballast material when the crane is to be airborne or transported by air or otherwise.

Another object of the invention is to provide an improved ballast containing tank or receptacle designed for use upon a crane structure, particularly a crane structure of the character and for the purpose described, which is capable of being easily and quickly filled with a ballast material such as rock, sand, water or any other material suitable for the purpose, and which is provided with bottom closures which can be easily and quickly shifted with respect to the body of the tank or receptacle to drop the ballast material when desired.

Still another object of the invention is to provide a new ballast structure for the purpose stated, in the form of a tank or receptacle, having bottom opening dump doors with means for sealing the doors when they are closed whereby the tank or receptacle can carry a load of liquid such as water or the like, for ballast, without leaking.

A still further object of the invention is to provide a unique ballast receptacle construction which is designed to be mounted upon a crane platform in close proximity to the crane operating engine structure and which is formed or constructed in a novel manner whereby when the receptacle is empty, portions of the walls thereof may be readily removed to facilitate reaching the engine for making necessary repairs or adjustments.

Still another object of the invention is to provide a ballast receptacle of a form to partially enclose or wrap around an engine housing whereby the weight of the receptacle and ballast contained therein and the weight of the adjacent engine structure can be concentrated at an end of a supporting platform, which carries the crane or lifting boom at the opposite end.

The invention is disclosed in two embodiments which will be best understood from a consideration of the following detailed description taken in connection with the accompanying drawings, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 8 is a rear elevational view of another or second embodiment of counterbalancing tank shown mounted upon the swing platform and illustrating the arrangement for giving access to the adjacent engine structure, the view showing the louvered panel of the wall of the engine housing adjacent to the ballast receptacle;

Fig. 9 is a top plan view of the counterbalancing tank shown in Fig. 8;

Fig. 10 is a view of the counterbalancing tank of Figs. 8 and 9, looking at the same from the front or forward side;

Fig. 11 is a vertical transverse sectional view taken substantially on the line 11—11 of Fig. 10;

Fig. 12 is a bottom plan view of the counterbalancing tank shown in Figs. 8 and 9, showing the bottom door assembly;

Fig. 13 is another view showing the door latch control assembly and the mounting of the same on the tank door;

Fig. 14 is a view looking at one side of the tank structure illustrated in Fig. 12 showing details of the door latching assembly;

Fig. 15 is an exploded view illustrating the second embodiment of the counterbalancing tank structure, showing portions of the swing platform to which it is secured;

Fig. 16 is a fragmentary sectional detail taken on the line 16—16 of Fig. 15;

Fig. 17 is a fragmentary sectional detail taken on the line 17—17 of Fig. 15.

Referring now more particularly to the drawings, the description will first be directed to the embodiment of the counterbalancing tank structure and adjacent parts of the mobile crane structure swing platform as disclosed in the copending application referred to.

Figure 2:
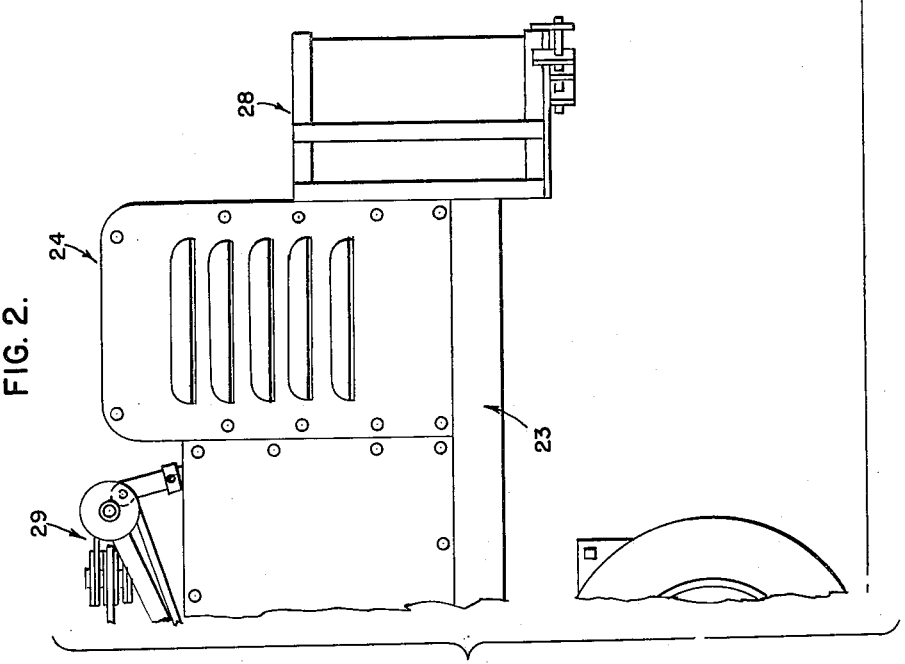
Fig. 2 is a view in side elevation of the structure shown in Fig. 1.
Figure 1:
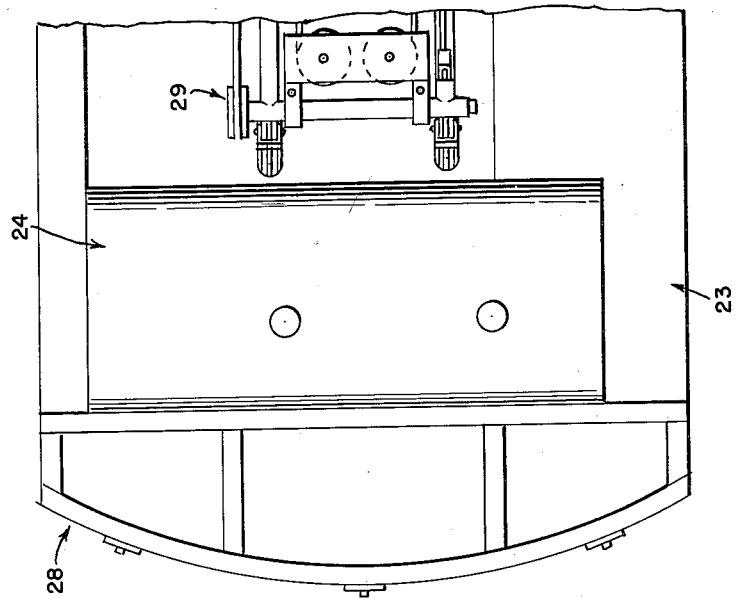
Fig. 1 is a view in top plan of the back or rear end portion of a swing platform for a crane structure such as is disclosed in the co-pending application hereinbefore referred to, and showing a portion of the A-frame mechanism, the motor or engine housing and one embodiment of the ballast receptacle which is secured to the rear of the swing platform.
Figure 3:
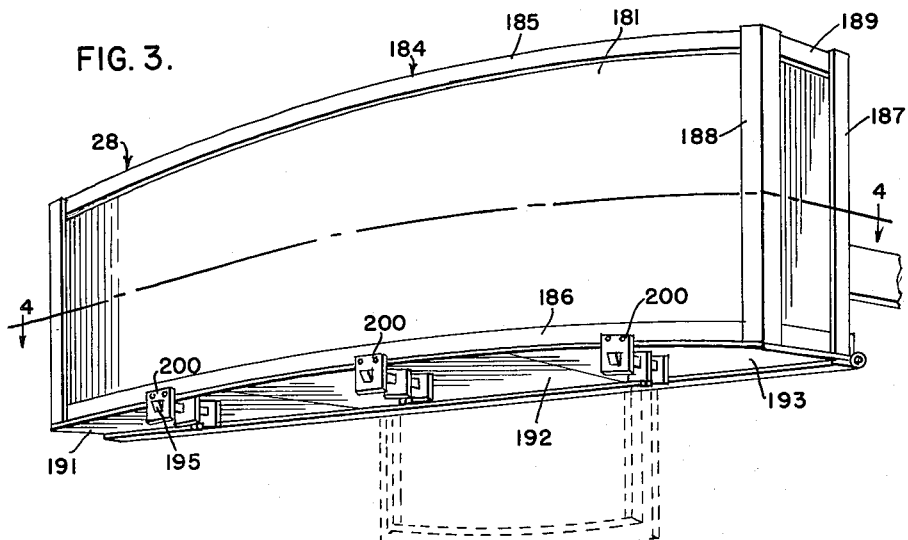
Fig. 3 is a perspective view of the counterbalancing tank or receptacle shown in the preceding figures.
Figure 4:
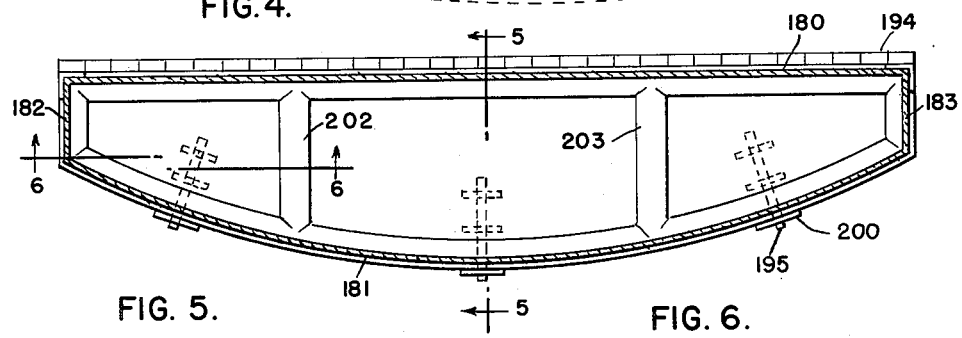
Fig. 4 is a longitudinal sectional view taken substantially on the line 4—4 of Fig. 3.

In Figs. 1 and 2 the portions of the mobile crane structure illustrated comprise a swing platform 23, motor structure for driving the drum shaft assembly, not shown, which motor structure is embodied in the housing generally designated 24. The motor structure 24 is mounted adjacent to the rear end of the swing platform 23 and on the rear end of this platform is secured the ballast tank 28 which as shown particularly in Figs. 1, 3 and 4, is preferably slightly curved in outline. This ballast tank or counterbalancing tank 28 is preferably permanently secured to the rear end edge of the swing platform, but may be detachably coupled therewith if found desirable.

The numeral 29 generally designates portions of the mobile crane construction such as the A-frame structure which, of course, is illustrated and described in detail in the copending allowed application and is defined by the allowed claims therein.

The ballast tank 28, which will be referred to as the first embodiment of the ballast tank of the present application and which is illustrated and described in the copending application referred to, is depicted in detail in Figs. 1 to 7, inclusive.

The ballast tank 28 embodies a front or forwardly directed wall 180 which is straight as shown in Figs. 1 and 4 or which may be curved if preferred, which curved formation is not here illustrated but is disclosed in the copending application, in Fig. 1 of the drawings thereof. The type of forward wall and its shape, of course, is governed by the contour or shape of the rear end of the platform 23. This tank 28 is of substantial width and preferably is substantially of the same width as the width of the swing platform 23 and is attached thereto by any suitable means such as brackets, bolts or the like, not shown, and these securing means may be permanent or removable ones so that the tank can be totally detached from the swing platform, if desired, or allowed to remain attached thereto.

The ballast tank 28 includes the forward wall 180 and a preferably transversely curved back wall 181 and the end walls 182 and 183 and all of these walls are of substantially the same height and the tank is preferably reinforced at its top 184 and ends and bottom exteriorly by angle irons 185, 186, 187, 188 and 189, which are welded or otherwise connected together. The bottom 190 of this ballast tank is preferably in the form of three separate closures or doors 191, 192 and 193 and which doors are hingedly connected to the bottom of the forward wall 180 or to the angle iron positioned thereat, by means of a piano type hinge 194 or ordinary individual hinges for each door may be employed, if so desired.

The doors are maintained in closed position by a simple slidable bolt 195 which is maintained between suitable guides 196 which are carried by each of the doors or closures. This bolt for each door or closure is preferably provided with a finger piece 197 by means of which it may be readily shifted or slide in the guides 196. When the bolt 195 is fully projected forwardly, the extreme end 198 thereof extends through an opening 199 in a keeper plate 200. It is, of course, understood and it is shown in Fig. 3, that there is a keeper plate 200 for the bolt of each closure and the bolts, the supporting means and the keeper plates are all of identical construction. These keeper plates 200 are here shown as bolted or riveted to the reinforcement angle 186 at the bottom of the ballast tank or the plates may be welded thereto if desired.

Figure 5:
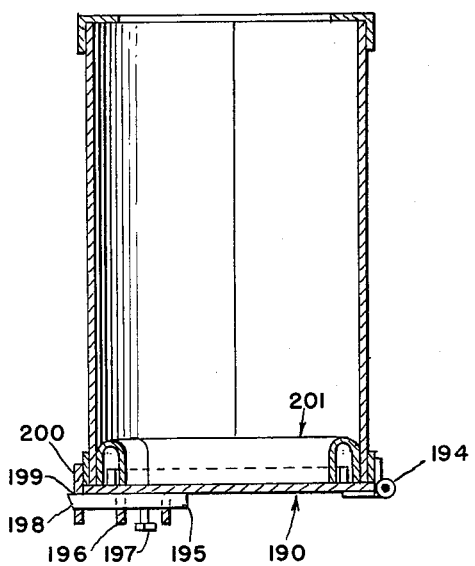
Fig. 5 is a vertical sectional view taken substantially along the line 5—5 of Fig. 4.

In connection with the ballast tanks herein disclosed and the embodiment thus far described, it is necessary to provide the hinged or other movable type of closure at the bottom of the tank in order that ballast therein may be readily discharged or dumped. Then, too, it is advisable in connection with such movable bottom closures for the ballast tank to have a seal between the closure and the tank wall where such tank may be filled with water for supplying the desired ballast or weight. In the construction of the first embodiment of the ballast tank which is generally designated 28, such a seal is provided in the form of an inverted rigid U-shaped member which forms a hollow channel opening downwardly in the extreme lower portion of the tank and this channel member is indicated generally at 201 and it is welded or otherwise secured in the bottom portion of the tank and the opening in the channel faces downwardly and also the free edges of the channel member are substantially flush with the lower front, back and end walls of the tank, as shown in Fig. 5.

Figure 6:
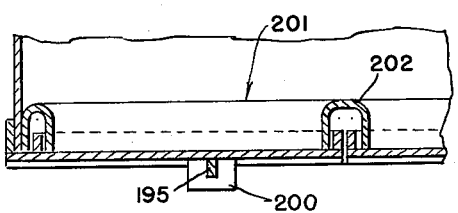
Fig. 6 is a longitudinal partial sectional view taken substantially along the line 6—6 of Fig. 4.

In addition to the channel member 201 which extends around the entire interior of the tank body at the bottom of the walls 180, 181, 182 and 183, there are provided the transversely connected inverted channel members 202 and 203 and these transverse channel members enter into the oppositely positioned portions of the continuous channel 201 which surrounds the bottom portion of the ballast tank, as shown in Fig. 6.

Figure 7:
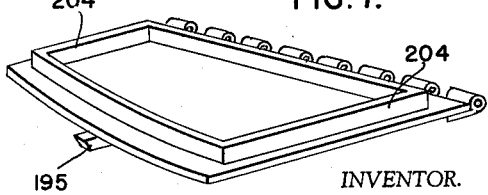
Fig. 7 is a detailed perspective view of the inside of one of the closures or doors for the bottom of the ballast tank shown in Fig. 3.

Each of the doors or closures on its inner face is provided with an upstanding continuous flange 204 and portions of this flange on each door, as shown in Figs. 6 and 7, extend respectively into the channel portions 201 in the bottom of the tank and the transversely connecting channel portions 202 and 203. Thus as each door is provided with the upstanding or outstanding flanges 204, when the portions of these flanges are disposed in the channel members 201, 202 and 203, there results a very effective sealing of the bottom of the ballast tank, even against water, if such should be used as the ballast medium in the tank.

If desired, of course, rubber sealing gaskets may be utilized in addition to the flanges 204 to seal against leakage of water from the ballast tank but these flanges and the aforesaid channels serve quite effectively to seal against any excessive leakage of water from the tank, likewise the flanges 204 on the closures will prevent leakage of sand or other fine granular ballast from the tank. Of course, where rocks, bags of cement or the like are available and used in the ballast tank, the question of leakage is not present.

Figs. 8 to 17, inclusive, illustrate a second embodiment of ballast tank which, like the first embodiment, is designed to be secured to the back end of the swing platform of the crane and which is designed to not only concentrate the weight of material therein around the adjacent engine structure, but which is also designed in a novel manner to facilitate reaching the engine structure through the enclosing housing for making repairs or adjustments without having to remove the ballast tank.

In Figs. 8 and 9 the rear end portion of the crane platform is generally designated 323 while the motor structure and housing therefor are generally designated 324 and the ballast tank is generally designated 325.

As shown in Fig. 8 the motor housing has a back wall panel 326. This panel is louvered for ventilating the housing and is removable when it becomes necessary to reach the encased engine or motor.

The ballast tank forming the second embodiment comprises a forward or front wall generally designated 327, a transversely arcuate back wall generally designated 328, and narrow side walls 329.

The forward wall is positioned against and secured to the back end of the swing platform 323 by the means hereinafter described, and this forward wall is broken to provide the lateral panel portions 330, the rearwardly offset central portion 331 and the connecting intermediate portions 332. Thus by rearwardly offsetting the central portion 331 there is provided a recess or bay in the forward wall into which extends the rear end portions of structural beams 333 which form a part of the swing platform structure and in which is set the rear side of the engine housing structure as shown in Fig. 9. Thus the ballast tank 325 constitutes a wrap-around construction which in association with the engine housing sets a portion of the ballast forwardly with respect to the engine housing, thereby setting up or providing a compact arrangement of parts which not only is important in a construction of the type of which the ballast box or tank forms a part where reduction of size is desirable, but it also concentrates the weight of the crane mechanism operating engine and the ballast in a small area at that end of the swing platform which must be counterbalanced against the load which must be raised by a boom at the opposite end of the platform.

The ballast tank 325 is secured to the back end of the swing platform 323 by a mounting angle bar 334. This bar is fixed with one angle against the forwardly directed faces of the panel portions 330 and the other angle is horizontally disposed and is extended across and secured to the structural beams 333 of the platform.

This mounting angle bar 334 is also utilized for attaching the hereinafter described door and door latching mechanism to the body of the tank.

The numeral 335 generally designates the door closure for the bottom of the tank. As illustrated particularly in Fig. 15, this closure door is in the form of a single sheet of metal which has a straight hinge edge 336, an arcuate rear edge 337 and straight end edges 338. The width of the door between the edges 338 is approximately the same as the width of the tank and as will be seen particularly upon reference to Fig. 12, the hinge edge of the door extends, when the door is in closed position, across and parallel with the panels 330 while the arcuate edge 337 substantially conforms to the arcuate contour of the back wall 328.

For the hinge mounting of the door 335 and the support of the latching mechanism for the door, the mounting bar 334 is provided at spaced intervals along its length with a number of vertically disposed, rigidly mounted hinge ears. These hinge ears are arranged in groups of two and as shown in Figs. 10 and 13, there is a pair of such ears adjacent to each end of the mounting angle bar 334, each of which ears of such pair being designated 339 and intermediate these pairs of ears 339 are two other pairs of ears, each of which is designated 340. The two pairs of ears 340 are spaced slightly farther apart than the pairs 339, for a reason hereinafter set forth.

Adjacent to each end of the door 335 there is secured to the underside or under face a single hinge plate 341 the width of which is perpendicular to the face of the door so that a substantial portion thereof projects away from the door, as shown particularly in Fig. 14, and each of these hinge plates projects beyond the edge 336 of the door and terminates in an upwardly projecting ear 342 which is adapted to position between a pair of fixed hinge ears 339, as illustrated particularly in Fig. 10. A pivot pin or hinge pin 343 is extended through the interleaved ears 339 and 342.

One of these hinge plates 341 also is formed with an aperture 344 for the reception of the hereinafter described latch shaft.

Located between the hinge plates 341 and extending across the width of the under face of the door 335 are two latch bolt guides each of which is generally designated 345. As shown particularly in Fig. 12, these latch bolt guides are formed of or comprise two long parallel hinge plates 346, each of which, like the hinge plates 341, has a substantial height to project from the under face of the door to which they are attached and each of these plates, like the plates 341, has its forward end extended beyond the edge 336 of the door and turned or extended upwardly to form the two spaced hinge ears 347. These hinge ears 347 are spaced apart a distance slightly greater than the pairs of fixed or rigid hinge ears 340 to which they are pivotally attached and the ears 347 straddle the adjacent hinge ears 340, as shown in Fig. 10, and are pivotally coupled thereto by pivot pins 348.

The plates 346 of each pair making up the latch bolt guides, at the ends remote from the hinge ears 347, are inset or shaped to lie relatively close together and are joined by the short connecting plate 349 to thereby form a latch bolt guide 350. This guide terminates adjacent to the inner edge of a shallow notch or recess 351 formed in the curved edge 337 of the door.

Secured by riveting, welding or in any other desired manner to the lower edge of the tank wall 328 in positions to be received in the door notches 351, are apertured keepers 352. The aperture 353 of each keeper 352 is adapted to align with the latch bolt guide 350 adjacent thereto when the door 335 is in closed position against the bottom of the tank.

The plates 346 have formed transversely therethrough and in alignment one with the other and in alignment with the shaft receiving or shaft bearing aperture 344 of the said one hinge plate 341, shaft bearing apertures 354.

Extending through the apertures 354 and the aperture 344 of the one hinge plate 341 is a latch bolt actuating shaft 355 and this shaft extends slightly beyond that side edge 338 of the door 335 adjacent to the apertured plate 341 and has rigidly secured to it the hand lever 356 which terminates adjacent to its upper or free end in the outwardly offset hand grip portion 357. This lever also carries adjacent to its upper end an apertured finger 358 by which the lever is secured in upright position when the door 335 is closed and the latch bolts are coupled with the keepers in the manner hereinafter set forth.

Between the plates 346 of each latch bolt guide 345, the shaft 355 has secured thereto two short spaced levers 359 and the free ends of these levers are connected by a coupling pin 360 which passes through and supports one end of an elongate latching bolt 361. These latching pins extend rearwardly to and through the guides 350 and project a sufficient distance beyond the latter to facilitate their engagement in the aperture 353 of the adjacent keeper plate 352 when the door is closed.

It will be understood, of course, that the free end of each latching bolt 361 has sufficient play or looseness in the guide 350 to permit the necessary oscillation of the bolt when the crank arms 359 are turned or swung by the shaft 355 for effecting either the withdrawal of the ends of the bolts from the apertured keeper plates 352 or their extension through the apertures of the plates when the door is closed.

When the tank door is in closed position the latch bolt actuating lever 356 will be disposed vertically at the adjacent side of the tank and the finger 358 will be projected beyond the adjacent panel 330 and such panel has secured to it a pair of apertured guides 362 through which is extended a latch pin 363. This latch pin also passes through a single guide 364 which is inwardly spaced from the pair of guides 362 and between this guide 364 and the adjacent one of the guides 362 the latching pin carries a coil spring 365 which bears at one end against the guide 364 and at its other end against a collar 366 secured to the pin. This spring functions to normally urge the pin 363 outwardly so as to project its free end through the apertured finger 358 when the latter is located between the guides 362.

The door 335 for closing the bottom of the tank is preferably reinforced by an angle flange 367 which is upon its upper or top side and spaced from the edges of the door so as to enter the bottom of the tank when the door is closed and the arrangement of this flange 367 with respect to the walls of the tank is such that when the door is closed, a relatively close fit will be obtained to prevent the escape of ballast material of granular form, such as sand or the like.

As hereinbefore stated and as is shown in Fig. 9 particularly, the forward side or forward wall of the ballast tank fits relatively closely to the rear side of the engine housing 324. As it is desirable that the ballast tank be rigidly permanently attached to the rear of the swing platform, it is also desirable as a consequence to provide a means for reaching the housed engine if and when adjustments or repairs have to be made thereon and since the crane structure with which the ballast tanks of this invention are particularly designed to be used, is designed for compactness so as to make it convenient for air transportation, it will be understood that the hoist machinery and other pieces of mechanism are arranged close to the forward side of the engine housing. Therefore, provision is made for reaching the removable engine housing panel 326 through the ballast tank by providing the central panel portion 331 of the forward wall with a working opening 368 and providing in alignment with this opening a corresponding working opening 369 in the rear curved wall 328.

The working opening 368 is adapted to be closed by a door panel 370 which has along the bottom and sides thereof the offset flange 371 which engages against the inner face of the panel portion 331 of the wall when the door panel is fitted into the opening 368.

At its bottom edge the panel 370 has secured thereto a pair of lugs 372 which extend across and are in spaced relation with the bottom part of the flange 371, to engage against the forward side of the wall panel 331, as shown in Fig. 10, when the door panel is closed.

In order to maintain the door panel 370 in closed position, bolts or cap screws 373 are passed through the upper ends of the side flanges 371 and through the adjacent wall panel as shown in Fig. 10.

The rear work opening 369 is closed by a door panel 374 which is similar in construction to the panel 370 in that it is encircled by an offset flange 375 which, when the panel is fitted into the opening 369, engages against the inner side of the wall 328. This rear door panel 374 also carries at the bottom thereof and on the outer side, depending lugs 376 which engage against the outer side of the wall 328 as shown, and the outer panel is also secured in position by cap screws, bolts or the like 377.

In order to rigidify the top of the tank wall structure, there may be disposed along the inner side of the back wall 328 at the top edge thereof a reinforcing angle 378 which bridges the work opening 369 while the inner or rear face of the forward wall 327 may also have secured thereto at the top edge the reinforcing angle 379.

It is also desirable and preferred that a top closure member 380 be provided for covering the central part of the top of the tank as shown particularly in Fig. 9, and this top cover or closure 380 may be hinged as at 381 to the top edge of the door panel 370 or, if desired, it may be hinged to the reinforcing bar 379 which extends across the top of the work opening 368.

From the foregoing it will be apparent that there is provided by the present invention in the embodiments disclosed, a unique ballast container, tank or receptacle which is particularly well adapted for use in connection with a crane designed to be airborne, such as is disclosed in my allowed copending application.

The present application is a continuation-in-part application based upon the allowed application referred to, wherein the structure of the ballast tank shown in Figs. 1 to 7 is the same as that disclosed in the allowed application, the added material forming the second embodiment of the ballast tank structure being illustrated in the succeeding figures.

I claim:

1. A ballast tank comprising a body portion of substantial width and having upstanding front, back and side walls, the tank having an open top and an open bottom, a mounting bar secured across the width of the tank against the front wall, the mounting bar having a projecting flange, a plurality of pairs of hinge ears secured to the mounting bar against the underside of said flange, a door plate adapted to cover and close the said open bottom of the tank and having an underside and a front and rear edge, hinge plates secured to the underside of the door plate, each hinge plate having an end portion projecting beyond said front edge and located between and pivotally coupled to a pair of hinge ears, other pairs of hinge plates secured to the underside of the door plate and having end portions projecting beyond said front edge and located between and pivotally coupled to a pair of hinge ears, the pivot couplings between said hinge plates and hinge ears permitting the door plate to swing relative to said open bottom of the tank, each of the said other pairs of hinge plates extending across the door plate and terminating adjacent to the rear edge thereof, means connecting the terminal ends of the said other hinge plates of each pair and forming therewith a latch bolt guide, a latch bolt slidably supported in each guide for movement between the adjacent hinge plates, keepers carried by said rear wall for engagement by the latch bolts when the latter are projected, and means for projecting and retracting the latch bolts.

2. The invention according to claim 1, wherein said last means comprises a rock shaft supported upon the underside of the door plate and extending parallel with the front edge thereof, means operable at one side of the door plate and coupled to the shaft for rocking the latter, and an operative coupling between the shaft and the latch bolts.

3. The invention according to claim 2, wherein said operative coupling comprises a crank means rigidly attached to the shaft and pivotally coupled to the latch bolts.

4. The invention according to claim 1, wherein the first named hinge plates and said other hinge plates have portions extending downwardly from the underside of the door plate, said hinge plates having bearing openings therein and aligned in the direction of the width of the door plate and forming the said means for supporting the shaft.

5. The invention according to claim 1, wherein said front and back walls have aligned work openings therein for facilitating performance of work upon a structure adjacent to one wall, and a closure panel for and removably secured in each work opening.

6. The combination with a crane swing platform having a rear end and a crane mechanism operating engine on the platform adjacent to said end, of a ballast tank embodying connected upstanding front and back walls, said front wall having a rearwardly offset central panel portion forming a rearwardly extending bay, means securing the tank to the said rear end of the platform with said engine partly positioned within said bay, a movable door means attached to the lower part of one of said walls for closing the bottom of the tank, and releasable latch means for securing the door means in closed position.

7. The invention according to claim 6, wherein said central panel portion of the tank front wall has a work opening therein and said rear wall has a work opening in line with the front wall opening, said work openings providing access to the engine through the tank, and a closure panel for and removably secured in each work opening.

8. The invention according to claim 6, with means for actuating said releasable latch means comprising a rock shaft mounted on the movable door, an operative coupling between the shaft and latch means whereby rocking movement of the shaft effects actuation of the latch means, and an operating lever attached to the shaft for facilitating the rocking of the latter.

(References on following page)

References Cited in the file of this patent

UNITED STATES PATENTS

| | | |
|---|---|---|
| 933,129 | Smalley | Sept. 7, 1909 |
| 1,738,702 | Haseltine | Dec. 10, 1929 |
| 1,973,136 | Atkinson | Sept. 11, 1934 |
| 2,185,030 | Lockwood | Dec. 26, 1939 |
| 2,255,972 | Harvard | Sept. 16, 1941 |
| 2,526,613 | Tanguy | Oct. 17, 1950 |
| 2,745,362 | Lunde | May 16, 1956 |